United States Patent
Jessop

(10) Patent No.: US 8,963,819 B2
(45) Date of Patent: Feb. 24, 2015

(54) LIGHT MODULATING DISPLAY DEVICE USING ELECTROWETTING EFFECT

(75) Inventor: Richard V. Jessop, New York, NY (US)

(73) Assignee: Intellectual Properties I Kft., Budapest (HU)

( * ) Notice: Subject to any disclaimer, the term of this patent is extended or adjusted under 35 U.S.C. 154(b) by 359 days.

(21) Appl. No.: 12/781,545

(22) Filed: May 17, 2010

(65) Prior Publication Data

US 2010/0220044 A1  Sep. 2, 2010

Related U.S. Application Data

(63) Continuation of application No. 11/980,775, filed on Oct. 31, 2007, now abandoned, which is a continuation of application No. 11/130,432, filed on May 16, 2005, now Pat. No. 7,310,080, which is a continuation of application No. 09/803,445, filed on Mar. 9, 2001, now Pat. No. 6,924,792.

(60) Provisional application No. 60/188,474, filed on Mar. 10, 2000.

(51) Int. Cl.
 *G09G 3/36* (2006.01)
 *G02B 26/00* (2006.01)

(52) U.S. Cl.
 CPC .................................. *G02B 26/004* (2013.01)
 USPC .......................................................... 345/88

(58) Field of Classification Search
 CPC ............................. G09G 3/3433; G02F 1/167
 USPC .................................................. 345/87, 107
 See application file for complete search history.

(56) References Cited

U.S. PATENT DOCUMENTS

| | | | |
|---|---|---|---|
| 4,176,345 A | 11/1979 | Micheron et al. |
| 4,235,522 A | 11/1980 | Simpson et al. |
| 4,248,501 A | 2/1981 | Simpson |
| 4,419,663 A | 12/1983 | Kohashi |
| 4,442,019 A | 4/1984 | Marks |
| 4,569,575 A | 2/1986 | Le Pesant et al. |

(Continued)

OTHER PUBLICATIONS

Vallet et al., "Limited Phenomena for the Spreading of Water on Polymer Films for Electrowetting," The European Journal B, vol. 11, Issue 4, pp. 583-591, 1999.

(Continued)

*Primary Examiner* — Dennis Joseph
(74) *Attorney, Agent, or Firm* — H.C. Park & Associates, PLC

(57) ABSTRACT

A light-modulating or display apparatus employs electrowetting effect to controllably modulate, directly or indirectly, the shape or location of one or more measures of liquid. In one embodiment, at least one measure of liquid obstructs the passage of at least some portion of light passing onto, through or reflected off said apparatus, and thereby controllably modulating the angle of distribution, amplitude or intensity of light emitted or reflected by or passing through said apparatus. In another embodiment, light is propagating within a media due to the phenomenon of Total Internal Reflection, and one or more properties of light escaping from within said media through one or more adjacent measures of liquid is controllably modulated due to said change of shape or location of the measures of liquid.

2 Claims, 12 Drawing Sheets

(56) References Cited

U.S. PATENT DOCUMENTS

| | | | |
|---|---|---|---|
| 4,582,391 A | | 4/1986 | Legrand |
| 4,583,824 A | | 4/1986 | Lea |
| 4,589,730 A | | 5/1986 | Obu |
| 4,663,083 A | | 5/1987 | Marks |
| 4,795,243 A | | 1/1989 | Suzuki |
| 5,165,013 A | | 11/1992 | Faris |
| 5,181,016 A | * | 1/1993 | Lee .................................. 345/84 |
| 5,463,491 A | | 10/1995 | Check |
| 5,574,598 A | | 11/1996 | Koumura et al. |
| 5,582,700 A | | 12/1996 | Bryning et al. |
| 5,659,330 A | * | 8/1997 | Sheridon ........................ 345/84 |
| 5,731,792 A | | 3/1998 | Sheridon |
| 5,757,345 A | | 5/1998 | Sheridon |
| 5,808,593 A | | 9/1998 | Sheridon |
| 5,815,306 A | | 9/1998 | Sheridon et al. |
| 5,872,552 A | | 2/1999 | Gordon et al. |
| 5,892,497 A | | 4/1999 | Robertson |
| 5,956,005 A | | 9/1999 | Sheridon |
| 5,961,804 A | | 10/1999 | Jacobson et al. |
| 6,114,405 A | | 9/2000 | Zhuang et al. |
| 6,120,558 A | | 9/2000 | Poddevin et al. |
| 6,184,856 B1 | | 2/2001 | Gordon et al. |
| 6,221,267 B1 | | 4/2001 | Ikeda et al. |
| 6,369,954 B1 | | 4/2002 | Berge et al. |
| 6,377,249 B1 | | 4/2002 | Mumford |
| 6,473,072 B1 | * | 10/2002 | Comiskey et al. ............ 345/173 |
| 6,762,566 B1 | | 7/2004 | George et al. |
| 2005/0151709 A1 | | 7/2005 | Jacobson et al. |

OTHER PUBLICATIONS

Welcome to Nanolytics—Making Microfluids Just a Tool, Presented at "Macro Results from Microarrays," Conference in Boston, MA, Apr. 3, 2000.

Non-Final Office Action issued for related U.S. Appl. No. 09/803,445 dated Dec. 13, 2002.

Final Office Action issued for related U.S. Appl. No. 09/803,445 dated Sep. 16, 2003.

Non-Final Office Action issued for related U.S. Appl. No. 09/803,445 dated Jan. 9, 2004.

Notice of Allowance issued for related U.S. Appl. No. 09/803,445 dated Jan. 4, 2005.

Non-Final Office Action issued for related U.S. Appl. No. 11/130,432 dated Jan. 23, 2007.

Notice of Allowance issued for related U.S. Appl. No. 11/130,432 dated Oct. 26, 2007.

Non-Final Office Action issued for related U.S. Appl. No. 11/980,775 dated Nov. 17, 2009.

Non-Final Office Action issued for related U.S. Appl. No. 11/528,756 dated Jul. 8, 2009.

Non-Final Office Action issued for related U.S. Appl. No. 12/684,328 dated Feb. 7, 2012.

Final Office Action issued to related U.S. Appl. No. 12/684,328 dated Sep. 25, 2012.

Notice of Allowance dated Dec. 28, 2012 issued for U.S. Appl. No. 12/684,328.

\* cited by examiner

LIGHT MODULATING DISPLAY DEVICE USING ELECTROWETTING EFFECT

CROSS-REFERENCE TO RELATED APPLICATIONS

This application is a continuation of U.S. patent application Ser. No. 11/980,775, filed Oct. 31, 2007, which is a continuation of U.S. patent application Ser. No. 11/130,432, filed May 16, 2005, which is a continuation of U.S. patent application Ser. No. 09/803,445, filed Mar. 9, 2001, NOW U.S. Pat. No. 7,310,080, which claimed priority to U.S. Provisional Patent Application No. 60/188,474, filed Mar. 10, 2000, all of which applications are incorporated by reference.

FIELD OF THE INVENTION

The invention relates to surfaces with changeable colours. More particularly, the invention relates to colour screen displays and methods for manipulating the colours of the displays.

BACKGROUND OF THE INVENTION

There are various well-known electronic display means enabling someone holding a stylus to 'draw' or 'write' on said display means, and to see what they have drawn appear on, for example, a colour LCD screen.

To accomplish the above, it is also known that a suitable electrical charge at an electrode adjacent to an oil droplet, where said droplet is located within a suitable electrolyte, and where said droplet is separated from said electrode by a hydrophobic polymer layer, can induce a change in the shape of an oil droplet, thus changing the colour of a pixel on a screen.

It is similarly known that, in a similar system, a polar liquid droplet may replace an oil droplet. The polar liquid droplet may be moved when arranged with an insulating liquid surrounding it, with a ground plane within proximity to the droplet/insulating liquid reservoir, and with a hydrophobic polymer insulating layer located in between the droplet and more than one separately-addressable adjacent electrodes. This can be accomplished by charging, one by one, a number of electrodes adjacent to said droplet so as to cause the hydrophobic property of the local polymer surface to become hydrophilic, and causing the droplet to be attracted successively to first one and then another charged electrode-proximate location. Arrangements for achieving these effects are described in existing prior art.

To date, however, there are few if any colour display means which are electronically 'writeable' with a stylus, as well as being electronically 'erasable', and which are low-cost to manufacture.

Therefore, there is a need for a low-cost electronic display means which can display in colour what is drawn or written on its display area, and can later electronically erase the same displayed items. Further, there is a need for low-cost colour display means which do not employ, or which do not require, a stylus to achieve satisfactory addressing. The purpose of some of the following inventions is to exploit such approaches for a new application, that of directing light onto, or through, differently-coloured light filters so as to provide various different and innovative display means.

SUMMARY OF THE INVENTION

Methods and related devices for manipulating ambient light and various light sources for applications including colour displays, screen displays and colored coverings for a multitude of items is disclosed. Methods and related devices for manipulating light for decorative, signaling and other purposes are also disclosed.

DETAILED DESCRIPTION OF THE PREFERRED EMBODIMENTS

The Electronic Controlled Movement of Transparent Insulating Droplets Such as Oil in an Electrolyte The purpose of this invention is to induce oil droplets—or other suitable transparent or translucent items which are affected by electrostatic fields or charges, and/or variable electrowetting effects, and which, preferably, can function as optical lenses—to move from a position adjacent to one coloured indicia (say, red), to a position adjacent to a differently-coloured indicia (say, green), where the position of said indicia enables a viewer of such said (e.g.) oil droplet to first perceive the magnified image of the red indicia through the oil droplet, and then, after the droplet's movement due to electrostatic and/or/electrowetting changes to the second position, to perceive the droplet as having changed to a green colour.

Figure 1:
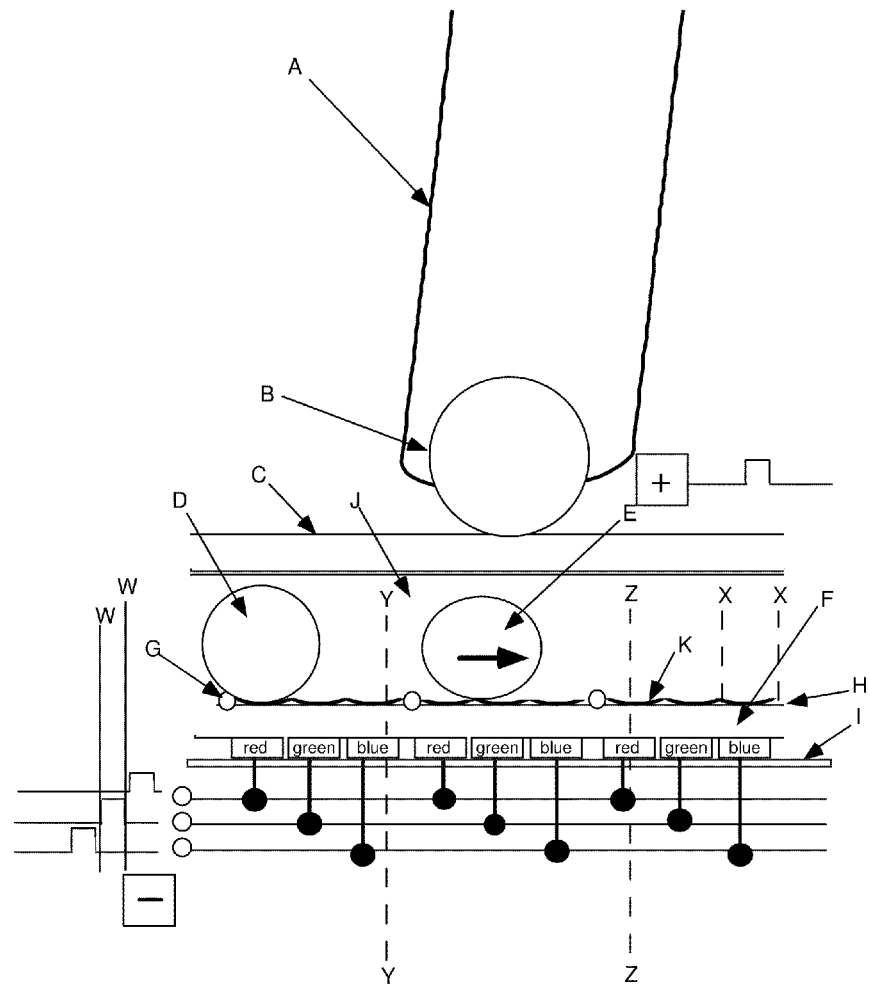
FIG. 1 is a cross-sectional view of a preferred display system with stylus which utilizes light which falls onto the screen surface.

In FIG. 1 we see an electrically-powered stylus being applied to the surface of a sheet of transparent, or translucent, electrically insulating material such as plastic or glass, advantageously with hydrophobic polymer on its lower surface Key to FIG. 1:
A Stylus
B Stylus tip
C Transparent insulating layer
D Oil droplet unaffected, or relatively unaffected, by stylus' electric field and/or counter-electrode-induced electrowetting changes on polymer surface effect
E Oil droplet affected by stylus' electric field, and/or counter-electrode-induced electrowetting changes on polymer surface, and moving towards position above charged (green) counter-electrode
F (Optional): transparent insulating material
G (Optional) (Graphically exaggerated) any suitable means of preventing the oil droplet's from leaving its cell
H Hydrophobic polymer layer immediately adjacent droplets and electrolyte Electrolyte and oil droplet
I Light-reflective layer
J electrolyte
K (optional) (graphically exaggerated, and not necessarily a physical indentation in the upper face of the lower transparent layer) any suitable surface of variable wetting properties, or of varying physical shape, which serves to impede (or enhance) the departure of droplets from their position(s) adjacent to colour filter means
W-W Electrical pulse in cyclical addressing system
YY&ZZ Lines representing the extreme right and left-hand positions to which droplet E can move In the particular arrangement shown above, which is only one of a number of possible arrangements for exploiting the same principle, there is a suitable electrolyte between the upper and lower transparent sheets, and within the electrolyte are shown two oil droplets.

Below the lower transparent and electrically insulating layer of hydrophobic polymer are shown counter-electrodes represented by rectangles with 'red' green' or 'blue' written within, with all same-coloured electrodes electrically linked to a suitable electrical power supply so that the potential is (preferably in many approaches, but not necessarily) cycled alternatively through the three colours, one at a time.

There is a hydrophobic polymer layer ('H') applied to the upper surface of the lower transparent sheet, or the lower transparent sheet will itself be a hydrophobic polymer layer. The lower face of the upper transparent sheet may also be hydrophobic polymer. The counter-electrodes and colour filters are so arranged that the colour filters will be visible from in front (i.e., above, in the above diagram) of the screen display means when a transparent oil droplet magnifies a particular coloured indicia or colour filter by locating itself above said colour filter. Thus, for example, the colours red, green and blue respectively may be positioned in front of their respective and corresponding counter-electrodes. Another possible arrangement would be that each counter-electrode surrounds each colour filter. A light reflector will also be provided behind the coloured indicia or filter if the display system is to be lit from the front, e.g., using ambient light.

There will be provided a suitable switch means on-board, or associated with, the stylus (to change the displayed colour where the stylus tip points) which will energise the stylus tip with a suitable electrical charge (or series of charges, preferably in sync with any cycled charging of the 'target colour' counter-electrode) of suitable polarity at preferably the same time as one or more counter-electrodes adjacent to the 'target colour' (i.e., the colour that the user wishes to 'write' in at that time) is/are energised. The stylus will be electrically connected to the display means—for example, by an electrically conductive wire.

The 'synchronisation' of the application of suitable electrical potential to both the stylus tip and the counter-electrode(s) associated with the 'target colour' can be achieved by any suitable means, such as microprocessor control of both items' power supplies.

In the above exampled illustration, a positive electrostatic field is delivered by the stylus tip, and a corresponding negative-poled electrical potential is simultaneously or near-simultaneously applied to one or more of the counter-electrodes adjacent to, or associated with, colour filters of the targeted colour proximate to the position of the stylus tip. As a result of the positively-charged electrostatic field generated by the stylus tip together with the charged counter electrode (s), the oil droplet will be induce to move to locate itself above the counter electrode which is currently charged due to the hydrophobic properties of the polymer surface adjacent to said charged counter-electrode becoming hydrophilic: the image of the coloured indicia, or light filter, will be magnified by the oil droplet, which will function as a lens, and the observer will consequently observe this particular 'cell' in the display matrix as being of that colour.

Notes on the Above Approach, and Alternative Possible Arrangements Using the Same Principles The stylus tip delivering the potential may be electrically insulated.

In an alternative approach, the hydrophobic layer on the underside of the upper transparent sheet of material may be removed, and instead the surface of the upper transparent sheet of material in contact with the electrolyte may be at any suitable position on a scale between hydrophilic and hydrophobic. In any event, in this light-reflecting version (see light transmissive version, below) a light-reflective surface should preferably be provided behind the colour filters, or the coloured indicia should themselves be sufficiently reflective to provide good brightness in ambient light conditions.

The indentations shown as 'K' on the above diagram may not necessarily be physical indentations: they may alternatively represent a wetting difference on the surface. These wetting differences, or physical indentations, may serve to retain the oil drops in their desired location by creating a physical or wetting resistance to their changing their positions. Such differential wetting surfaces, or physical indentations, may in optional approaches be also used on the underside of the upper transparent sheet of material.

The said 'oil droplets' need not necessarily be oil: they may alternatively be any suitable non-polar liquid.

The lower 'transparent sheet' need not necessarily be present, provided that there is a hydrophobic polymer layer present between the counter-electrodes and the electrolyte.

Although only three different colours (and corresponding electrodes) are shown in the diagram, there may, clearly, be any suitable number of different electrodes with corresponding different coloured filters. Alternatively, there may be two or more address lines leading to each counter-electrode, so that a variable potential may be present at different points along the resistant counter-electrodes, with a range of differently-coloured filters or indicia positioned above it or adjacent to it. In suchlike arrangements, any suitable means of inhibiting the droplet's movement on the polymer surface to above or adjacent to the highest-potential sector(s) of the resistant electrode may be provided—e.g., treatment of the polymer surface to achieve higher surface tension, or differing wetting properties—so that the droplet may only reach certain points or areas along the polymer when sufficiently high electrical potential is delivered to the resistant electrode area immediately adjacent to it. This 'variable electrical potential across an electrode' technique is applicable to the other droplet-moving designs and approaches described herein which employ electrowetting effects to achieve droplet movement.

In addition to coloured indicia or light filters, there may preferably be a 'white' or 'neutral' colour filter or indicia, to above which the oil droplets would be switched if they are 'erased' by any suitable electronic 'erasing' method. One method of electronically erasing the colours 'drawn' on the screen would be to provide a separate tool in addition to the stylus, which would attract the oil droplets to lie above the white indicia or filter—thereby allowing the screen to appear 'clean'. Such an eraser would preferably have a larger contact or near-contact area with the screen than the stylus tip, in order to allow for speedier removal of the 'drawn' material on the screen. Optionally, of course, the eraser and the stylus could be combined into one unit. In systems employing a row and column or other suitable address system capable of addressing individual or groups of 'cells', then all cells could alternatively be near-simultaneously turned a suitable neutral colour by the microprocessor without the need for a stylus-style eraser.

There are many different possible arrangements of the counter-electrodes and their address lines, both to provide different numbers of possible colours, and to reduce manufacturing cost by, for example, arranging for all the counter-electrodes to be positioned on the same substrate underneath the lower hydrophobic polymer layer. One of the advantages of the approach we are currently discussing is that there is not necessarily any need to separately address each 'cell' (i.e., each arrangement of counter-electrodes and corresponding colour filters adjacent to each oil drop): all the greens, for example, can be optionally be linked together, as can each of the other sets of similarly-coloured counter-electrodes. The reason for this is that in suitable addressing arrangements with appropriate electrical potentials applied, the counter-electrodes may only have a movement-inducing effect upon droplets when the stylus is located above or close to said droplets.

Thus, in the particular addressing approach shown, there may be no need for row and column addressing. As an example of one possible physical layout of the colour filters, the Red, Green and Blue counter-electrodes could be arranged as though they were three equal portions of a pie chart on the same plane with insulation or a gap in between them: the 'same-colour' portions of each counter-electrode set could be run so that there was no need for insulating layers between the differently-coloured lines—at least, until the lines reached the edge of the array.

In such an arrangement, it would be possible to place a white area at the centre of the circular counter-electrode array, for example, so that by powering all three counter-electrodes, the oil drop could be induced to stay in the middle of the circle, and display a white/neutral colour. Similarly, of course, applying different potentials to different counter electrodes in a suitably-configured arrangement would provide the means of employing a colour wheel—whereby the drop could be steered to precisely the colour that was desired.

Whilst powering the differently-coloured sets of counter-electrodes by cycling through them has been mentioned, clearly they may be addressed in any other suitable way—e.g., continuing to apply an appropriate potential to counter electrodes associated with one 'colour-set' until a suitable electronic feedback circuit confirms the target oil drop(s) has/have arrived at their target destinations, for example, or applying a potential to one or more counter-electrodes for a specified time to allow the droplet to reach a position adjacent to the target colour.

Optionally, an electrode connected directly into the electrolyte may be provided, with an electrical potential opposite to that applied to the counter-electrodes, for example, for such purposes as causing the droplets to flatten their shapes (an electrowetting effect) so as, for example, to (a) enhance their lens-like properties and/or (b) to impede any tendency to move from their assigned locations. An appropriately-polarised charge to the electrolyte could optionally also be used to clear the display, where suitable addressing arrangements are made.

The surface of the polymer layer in this or other droplet-moving designs described herein may optionally be treated with any suitable surface pattern—whether by deposition or other means—to achieve higher and/or lower surface tensions at different points or sectors on the polymer. Alternatively, higher and lower, or specifically-shaped, differing physical levels of the upper and/or lower of the two sheets of material shown (i.e., the underside of the top screen layer, and the lower polymer layer) may be provided, so as to impede or enhance the droplets' inclination to position itself at certain points on said surface, or to achieve specific optical effects such as inducing the droplets to have a suitably curved surface at their top sides so that they can function, or better function, as an optical lens to direct light onto the selected colour filter(s).

Such techniques may, for example, be used to impede a droplet's movement away from its assigned location until a suitably high electrical potential is applied to an adjacent electrode to induce it to move—by, for example, changing the wetting properties applying to said droplet at the polymer surface so that certain locations along the surface become more or less hydrophobic or hydrophilic, thereby inducing the droplet to move accordingly. In other droplet-displacing display systems (see below) where the droplet(s) are electrically-charged and electrowetting changes are important, similar such 'droplet movement-impeding' means may also be used.

Use of the Above System without a Stylus

If a stylus is not to be incorporated in the above system, then clearly an alternative addressing system is required. Instead of the stylus delivering an electrical potential opposite to that of the charged counter-electrode(s), that oppositely-poled potential would instead be delivered into contact with the electrolyte or alternatively immediately adjacent to said electrolyte, but electrically insulated from it, with any one of numerous well-established addressing methods used to apply potential to selected counter-electrodes.

The Controllable Movement of Polar Droplets in an Electrically Insulating Liquid to Effect perceived colour change at different 'cells'

A somewhat similar approach to that shown above can alternatively be used, whereby instead of an insulating liquid such as oil being used for the droplets with an electrolyte surrounding them, the droplets are instead made up of polar liquid, and the surrounding liquid is an electrical insulator, such as silicone oil.

Figure 2:
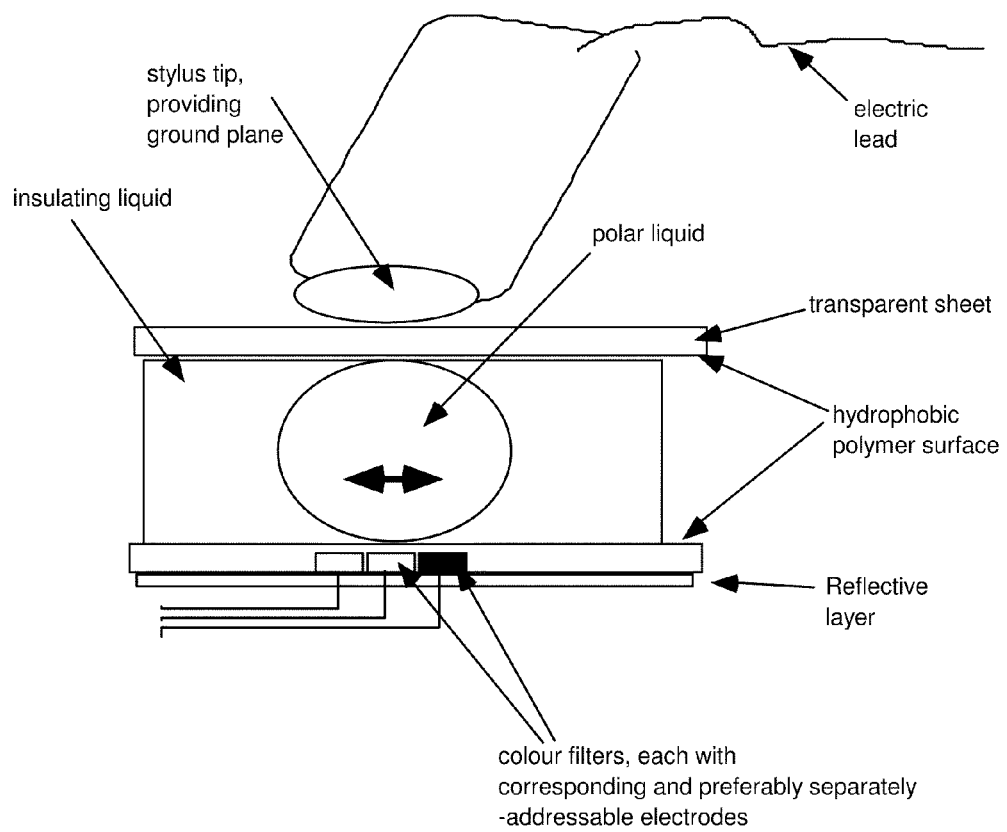
FIG. 2 is a cross-sectional view of another preferred display system with stylus which utilizes light falling onto the screen surface.

Referring to FIG. 2, the electrodes associated with each colour—or multiple colours—in each 'cell' are preferably separately addressed with a suitable electrical potential, thereby inducing a change in the hydrophobic polymer surface immediately above it to cause it to become hydrophilic, and to induce the droplet to move towards a position adjacent to said charged electrode.

If a stylus is employed in this system, it will preferably provide the ground plane function. It is the differential between the electrical potential existing between the stylus and the colour-associated electrodes beneath the stylus that induces the droplet to be moved as a result of local hydrophobic/hydrophilic properties affecting the droplet on the polymer surface.

When one or more particular electrode(s) is/are charged with a suitable electrical potential to induce hydrophilic and/or hydrophobic effects upon adjacent droplet(s), other adjacent electrodes may remain uncharged, or, optionally they may be induced with a potential to enhance the droplet's movement to the desired location. The potential and/or polarity applied to the stylus may be varied dynamically in some design approaches, according to the particular different addressing systems employed. Clearly, the droplet can be 'passed' from electrode to electrode in a stepping manner—for example, to cause it to progressively move to its ultimate target colour.

Although only one address line is shown in FIG. 2 leading to each colour, other alternative addressing systems will be discussed below which could also be used.

Non-Stylus—i.e., Colour Display Screen—Version Using the above Approach

If a stylus is not to be used in a system such as that shown above (i.e., if the system is to be used as a colour display means without a stylus to participate in the addressing functions), then the lower surface of the upper transparent sheet can, optionally, be made electrically conductive—e.g., using ITO sputtering to make it conductive and transparent, or as another of a number of possible arrangements, an arrangement of non-transparent conductive material that does not unacceptably obstruct light paths can be provided—so that it performs the function of the ground plane.

Many possible alternative well-established addressing systems can be used for such an approach, including those where a continuous ground plane is used above the droplet(s), with address lines below to each cell or groups of cells, or to particular colour-associated electrodes (or portions of resistant electrodes) within each cell; alternatively, for example, a row and column system can be used—for example where the rows are carried along the top sheet, and the columns along the bottom—and so on. In some approaches, transistors and/or diodes are employed to achieve variable potential addressing of different cells.

An alternative approach is to provide a polar material, or electrolyte, above (in respect of the above diagram) the polar liquid droplets and their surrounding electrically-insulating liquid. Such an electrolyte may be deposited onto the lower surface of the upper transparent sheet of material (i.e., which form the viewing screen of the display system); alternatively, for example, the electrolyte or polar liquid could 'ride above' (due to lower density) the droplets and surrounding insulator. Clearly in such an approach (as is usually the case in all systems described in this document where more than one liquid element is present in the same reservoir) the respective liquids would have to be immiscible. An appropriate means could to be made to prevent the polar liquid droplets from contacting the electrolyte or polar liquid, and a suitable electrical potential would be connected to said polar liquid to allow it to function as a 'ground plane'. Optionally, said electrolyte, or conductive material, if deposited on the lower face of the upper transparent sheet, could be divided into separately-addressable sectors insulated from each other.

The Controlled Movement of Electrically-Charged Droplets in Respect of Colour Filters Another alternative approach to achieving the electronically-controllable movement of liquid droplets is achieved by inducing an electrical charge into a droplet. A surface surfactant, for example, can be used to enable an oil drop within a liquid electrolyte to retain a charge of suitable polarity, by inducing differently-poled charges at each end of molecules surrounding the droplet, thereby presenting a consistently-poled exterior surface to said droplet.

Alternatively, conductive material can be added to retain the charge within an insulating liquid droplet where the outer surfaces of said droplet are electrically insulating, or where the liquid surrounding the droplet is itself electrically insulating.

Alternatively, two different immiscible liquid insulators may be used, the one which is carrying an electrical charge being transparent if it is to function as a lens, and being permanently-coloured if it is to function within a system where different droplets pass in front of light paths so as to change the colour of the light (see below) passing through said droplets.

A further alternative is to induce a charge in a polar liquid surrounded by an insulator material or liquid.

As used in this document, "droplets" may refer to not just to liquid droplets, but also to any kind of particles, provided that the particles may perform a light-refracting or light-reflecting function, and provided that an electrowetting effect is not critical to the functionality of the 'droplet-moving' design. Such particles might, for example, bear one or more different colours on their surface(s), so that by reorienting themselves in respect of light paths, they cause different colours to be displayed when differently-poled charges are applied, as described herein.

In any of these approaches, the electrodes, or series of electrodes, will preferably be suitably individually-addressable, and will be induced with an electrical potential of opposite polarity to that of the charged droplets when the objective is to attract said droplets to move adjacent to said electrodes; and, conversely, where the objective is to repel said droplet(s), then the polarity of the charge delivered to said electrodes would be similar to that of the targeted droplet(s).

Figure 3:
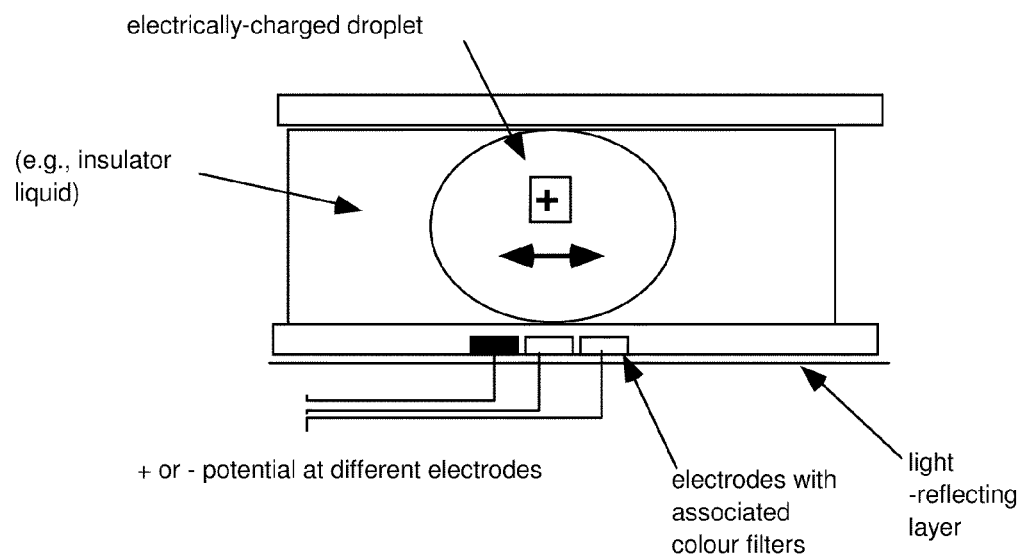
FIG. 3 is cross-sectional view of a preferred display system which shows the movement of a electrically charged droplet.

FIG. 3 shows one way in which a droplet may be attracted towards, and/or repelled from, different colour-associated electrodes: the actual composition of the droplet and/or the liquid surrounding it would depend upon which of the above-described approaches to retaining an electrical charge of a particular polarity is employed. At least the bottom layer, and preferably also the top layer adjacent to the insulating liquid shown in the diagram will be electrically insulating in any of the different approaches. As mentioned before, although individual address lines are shown leading to the different colour-associated electrodes, other addressing approaches may be used, some of which are discussed herein.

Clearly, regardless of which of the design approaches described above is employed, the essential point is that by changing the polarity and/or potential delivered to the different electrodes, the droplet can be attracted and/or repelled so as to position itself above whatever colour is currently desired. As with the other Figures, the fact that only three different colours are represented does not limit it to such a range: there may be only two colours, or there may be any other number that are desired, provided that the addressing and control means of attracting/repelling the droplet is able to induce it to position itself appropriately to focus light onto or through said colours.

It should be pointed out here that though the use of electrically-charged droplets acting as lenses or light reflectors to cause light to be selectively directed onto target colour(s) is shown in the context of liquid droplets within other liquids, the claims of this patent application include the use of such charged droplets where said droplet(s) are not surrounded by a liquid, but instead any suitable gas, including air, or a vacuum.

Backlit, or Side-Lit Alternative Versions of Droplet-Moving Display Systems

In an alternative embodiment to those shown thus far—which employ light-reflective surfaces underneath the movable droplets, backlighting can be instead be provided, which can focus or direct light through droplets serving as lenses (or indeed in alternative approaches can obstruct light from passing) onto selected colour filters, which in such cases may lie above said droplets.

Figure 4:
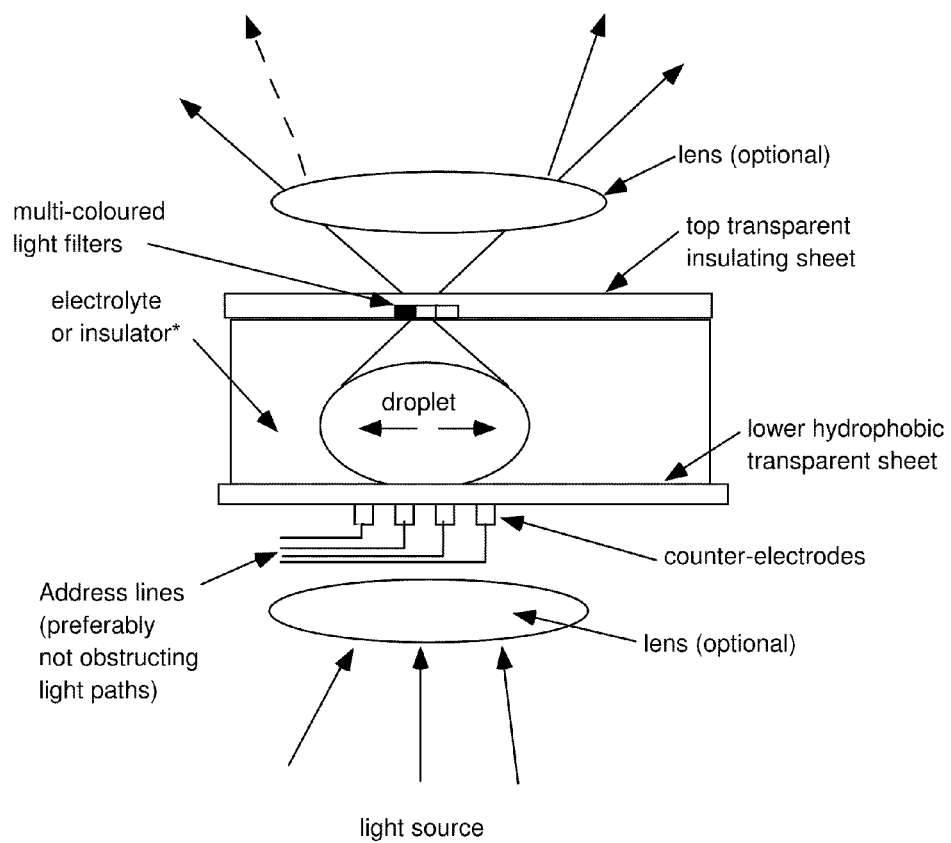
FIG. 4 is a cross-sectional view of a preferred backlit display system.

In one embodiment shown in FIG. 4, the primary difference in the design would be that the reflective surface provided in the front-lit designs, which is located behind the colour filters or coloured visual indicia, would be removed, and the colour filters would be located on the side of the oil droplets which is opposite the light source.

The light passing from the backlighting source would pass, in the case of each cell, through the droplet, which would focus the light onto one of other (or a combination of) the light filters appropriately located above or adjacent to the oil droplet in each cell. Having passed through the targeted colour filter(s), that cell, or droplet, would be perceived by the human viewer of the cell (or display screen composed of cells) as being of the colour of the filter(s) through which the light had passed. One suitable possible location for the colour filter array would be on or within the top sheet of transparent material.

This arrangement is applicable not only to droplet-moving, stylus-employing screen systems, but also to any screen display system conforming with any of the liquid droplet design approaches described herein. All such approaches require appropriate light passages from the backlighting means through to the point at which the light emerges from the screen at the top of the system.

Optionally, optical lenses may be suitably positioned above and/or below any backlit droplet or particle-moving display using approaches explained in this document, so as, for example, to better focus light onto or through droplets, or to distribute the image or colour of a droplet over a large portion of the front display screen.

FIG. 4 illustrates this approach: where the term 'electrolyte or insulating liquid' is used, the 'insulator' option applies to a different approach, outlined elsewhere herein, where a polar liquid droplet is used, surrounded by an insulator. Other design approaches are also described in this document where this backlit approach could be used—for example, where the droplet is permanently electrically charged.

With a side-lit system, the upper surface (in FIG. 4) of the light carrying means (e.g., an internally-light-reflecting device) could be designed to allow light to escape upwards—i.e., through the droplets towards the colour-bearing indicia or filters.

The above approach can be applied to any suitable designs described within this document.

Modification of Droplet Shape to Provide, or Enhance, the Droplet with Lens-Like Optical Properties Regardless of which of the droplet-moving design approaches described in this document is employed, there may be occasions where a lens-like performance is required of a droplet so as to focus light onto one or more particular colour filters or indicia, but where a curved top cannot be provided to the droplet so as to allow it to adequately perform the lens function—due, for example, to the upper layer of material adjacent to the electrolyte or insulating liquid (as appropriate to each system) preventing the droplet from forming an adequately and suitably curved surface so as to function as a lens.

Figure 5:
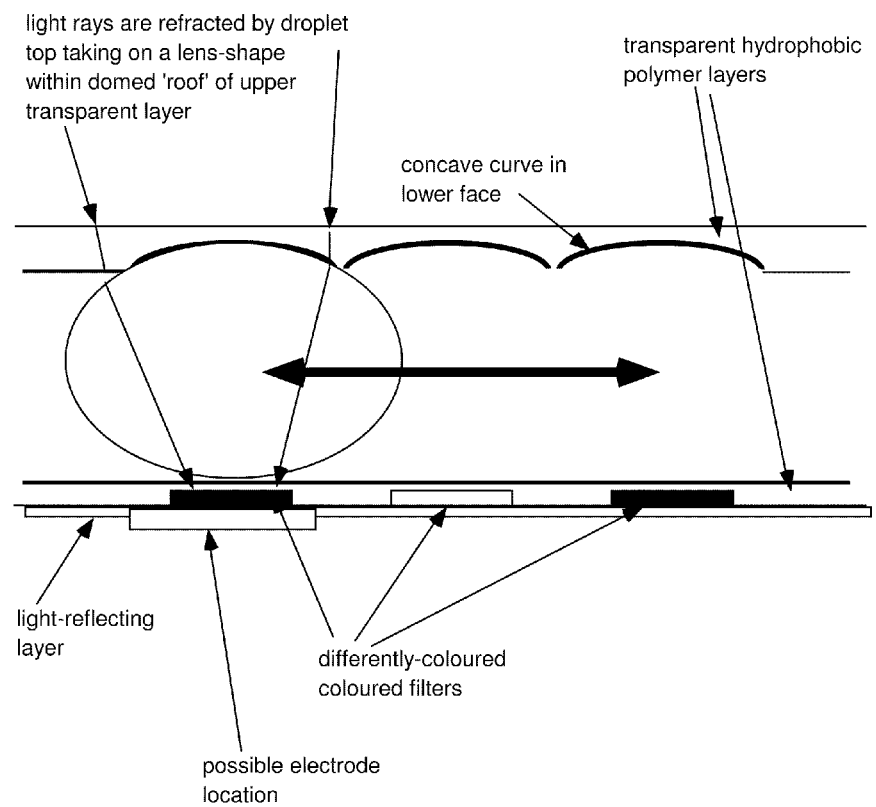
FIG. 5 is a cross-sectional view of a preferred display showing one arrangement where the droplets change their shape so as to function as lenses.

FIG. 5 illustrates one possible solution to such a problem: here we see a droplet located in a different type of liquid (as appropriate to the particular system employed) which is in a reservoir delimited by two sheets of material, as elsewhere described herein. The colour filters with their respective corresponding electrodes are shown below the droplet.

It will be appreciated that in the particular example shown below, which includes a light-reflective layer below the colour filters, provided that the refractive index of the droplet is sufficiently greater than the refractive index of the upper sheet of transparent material, the droplet will function as a lens. The particular respective refractive indexes, and the curvature of the 'dome'-shaped 'dimple' in the lower face of the upper transparent sheet of material, will be determined so as to focus light coming from above (in the example shown in FIG. 5) onto the targeted coloured light filter. If the droplet in FIG. 5 is induced by potential being applied to one or more appropriately-located electrodes to move towards the adjacent dome-shaped indentation to its right, then clearly it will compress its shape to some extent to do so, and will then regain some vertical height as it re-shapes itself to conform with the dome-shaped indentation into which it moves.

It should be pointed out here that the lower surface of the upper sheet of transparent material may be optionally be non-hydrophobic, or may be hydrophilic.

Further, because FIG. 5 is drawn to be 'generic', and not specific to any of the different droplet-moving methods described herein, details of the locations of electrodes and counter electrodes, etc. are not shown in the drawing.

Clearly, the above system can be inverted if a backlit display, for example, were used. Similarly, for certain functions, the concave 'dome' shape shown could instead be convex if so desired, with appropriate respective changes in the refractive index of droplet and transparent sheet being made as necessary. Optionally, such concave shaping of the, e.g., polymer surface in contact with the liquid(s) can also, or alternatively, be employed on the lower sheet of material.

The Controlled Movement of Permanently-Coloured Droplets to Achieve Perceived Colour Change on a Display Screen System It will be appreciated that similar methods to those described for moving transparent, translucent or light-reflective liquids described in this document can also be used to move droplets which are themselves dyed, or otherwise permanently reflect, particular different colours.

Whereas, for example, with transparent liquid drops we may have been concerned with positioning them so that they refract light so as to focus it on or through particular colours amongst a variety available, with permanently-coloured liquids, by contrast, we are instead concerned with placing droplets bearing the colour(s) we desire to be displayed to be moved into appropriate light paths.

The use of differently-coloured droplets clearly requires a means by which the droplet(s) of the desired colour(s) may be addressed, and thereby caused to move into the light path(s). There are many potential means by which this can be achieved, and we will only examine a brief sample here for the purposes of example.

Such approaches may include electronically-controlled display systems for selectively moving one or more coloured droplet(s) among more than one coloured droplets which are joined to each other, or are attracted to each other, or are adjacent to each other, but in any approach are preferably composed of mutually immiscible liquids, into a light path by electrostatic means, where at least one droplet is electrically charged with an appropriate polarity and potential, or where at least one droplet is addressable, and can be induced to move by any of the droplet-moving methods described herein, by virtue of said droplet(s) being alternatively composed of polar liquid or an insulating liquid. Optionally, more than one droplet may be discretely induced to move itself, by any combination of the droplet-moving methods described herein, or more than one droplet may have the same droplet-moving method applied to it, where it and its environment accord with the methods described herein to move droplets.

Figure 6:
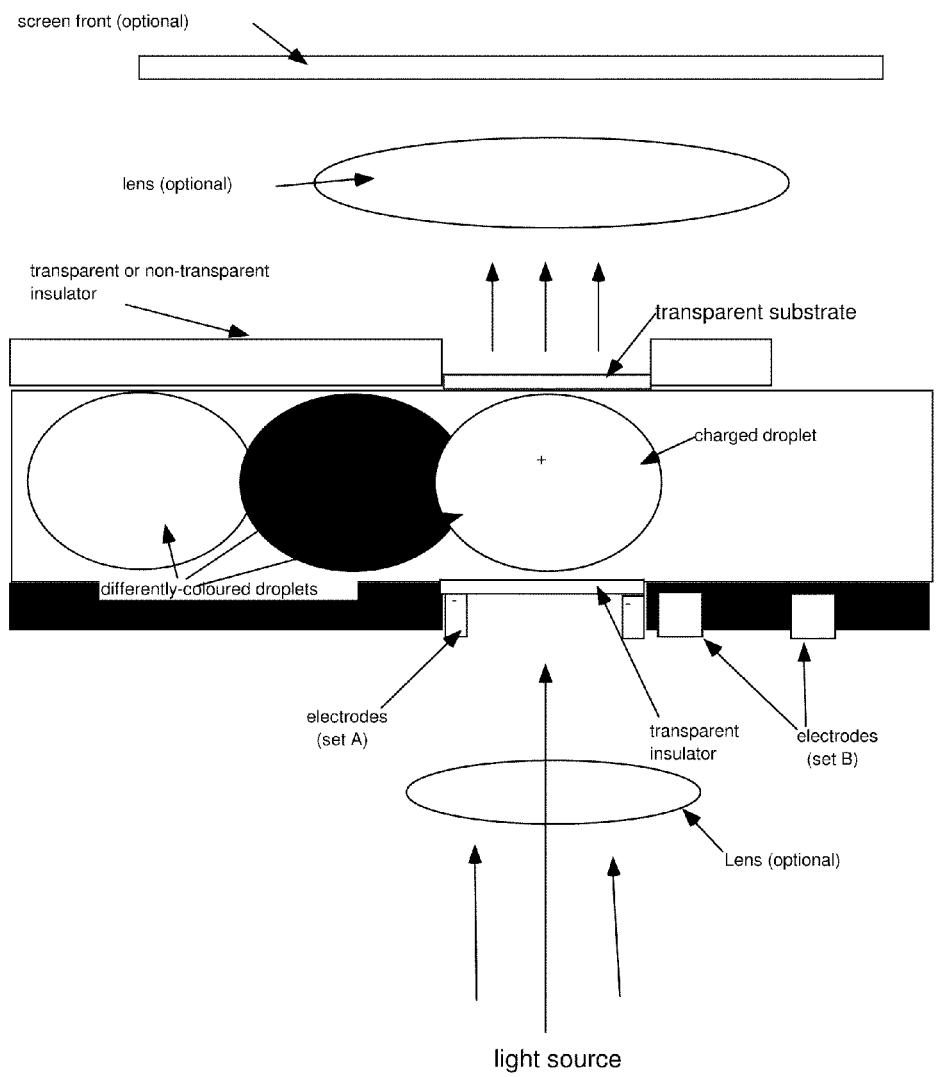
FIG. 6 is a cross-sectional view of a preferred display system which utilizes differently-coloured droplets.

FIG. 6 illustrates one such implementation of the above approach: the three droplets shown, which may be assumed for example to be green, red and yellow (from left to right) are joined together by any suitable means, or are permanently attracted to each other. In FIG. 6 only one coloured droplet—the yellow one on the right—bears an electric charge: the other droplets do not, and may, for example, be of non-polar, or insulating, material. All 3 droplets and any insulator in which they are located, are preferably mutually immiscible.

Top and bottom sheets of material shown adjacent to the droplets may be taken to be transparent or non-transparent insulators—though in certain design approaches the top sheet could be conductive Towards the bottom right and top right there are shown two sheets of transparent material, which function as windows to permit light through.

Sets of electrodes (the term sets is used because they appear to be separate, though, in fact, they may be one conductive item), circular in shape with a hole in the centre to allow light to pass through, are also shown. It will be appreciated that when an appropriate negatively-poled potential is applied to set A electrodes, if the yellow droplet were not already present in the light path, it would have been induced to move into it If instead Set B of electrodes is now charged with a suitable negatively-poled potential, the yellow (right-hand) droplet would move to reposition itself to the right of its currently-shown position—thereby dragging the red and green droplets after it, and positioning the red (middle) droplet in the light path—thereby changing the light passing through the 'windows' from yellow to red in colour.

Only two 'sets' of electrodes are shown in the diagram: clearly, in order to be able to move green into position, a further set would in most arrangements be required, ideally negatively charged, to the right of set B of electrodes. In order to move the 'train' of coloured droplets back again to the left, the electrodes would be pulsed appropriately one-by-one.

If potential of polarity similar to that of the charged droplet is applied to one or more electrodes, then the repelling force thereby generated can also, or alternatively, be used to achieve droplet motion.

If desired, more than one droplet may be permanently charged—either with the same polarity, or with different polarities of electrical charge, depending upon the appropriate arrangement of pulsing the electrodes with appropriate polarity and potential.

Instead of backlighting the system as shown above, a reflective surface could instead be located where the lower transparent 'window' is shown.

An alternative arrangement would incorporate one or more optical lenses, suitably-positioned and configured so as to magnify the image and/or colour of the 'targeted' coloured droplet. If the system were light-reflective, this lens arrangement could for example be located above the target droplet, with a reflective layer underneath the droplet. Said reflective layer may optionally be curved.

If, alternatively, a light source were provided for backlighting, then of course the reflective layer would be removed, and appropriate lens or lenses located so as to 'fill' the cell area at the screen front with light of the colour of the illuminated droplet. Additional lenses may optionally be used in such arrangement to direct the light towards the location where the target coloured droplet is located.

Figure 7:
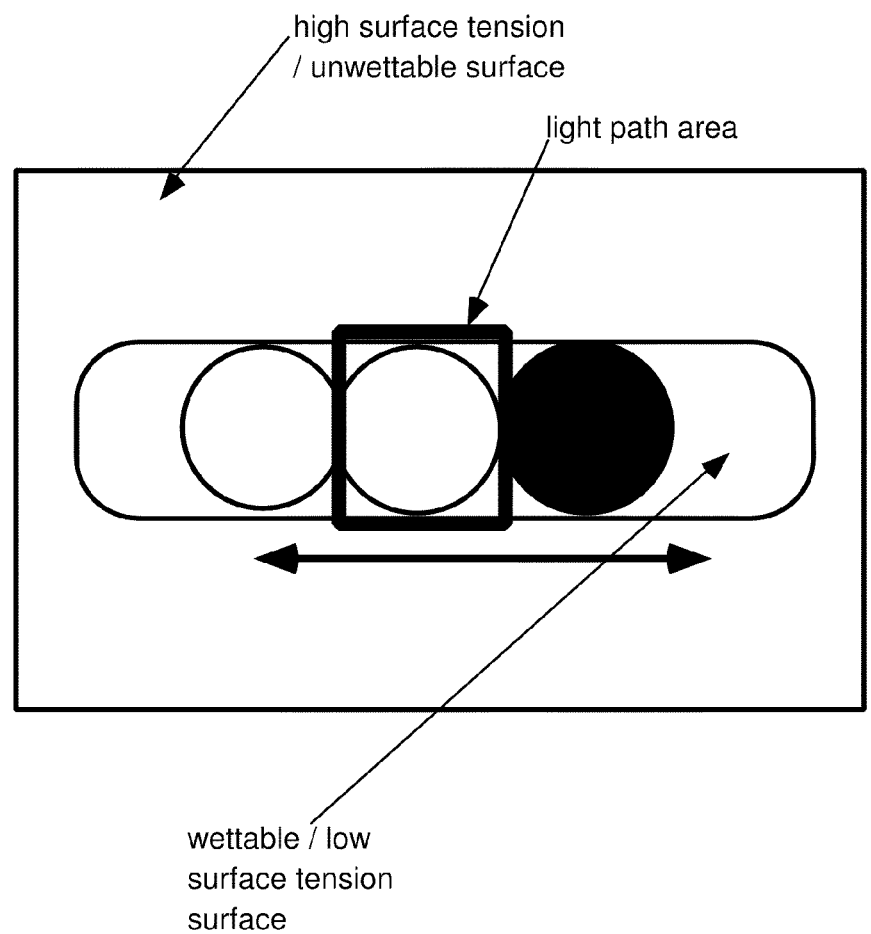
FIG. 7 is a top view of the display system shown in FIG. 6.

FIG. 7 shows one optional arrangement whereby said coloured droplets could be prevented from escaping from the area within which they are free to move. The wetting, or surface tension, properties of the centre and outer area are such that the droplets would be repelled from them, and would instead be induced to remain in the central area. Positions of electrodes, etc. are not shown in this drawing for purposes of clarity.

Figure 8:
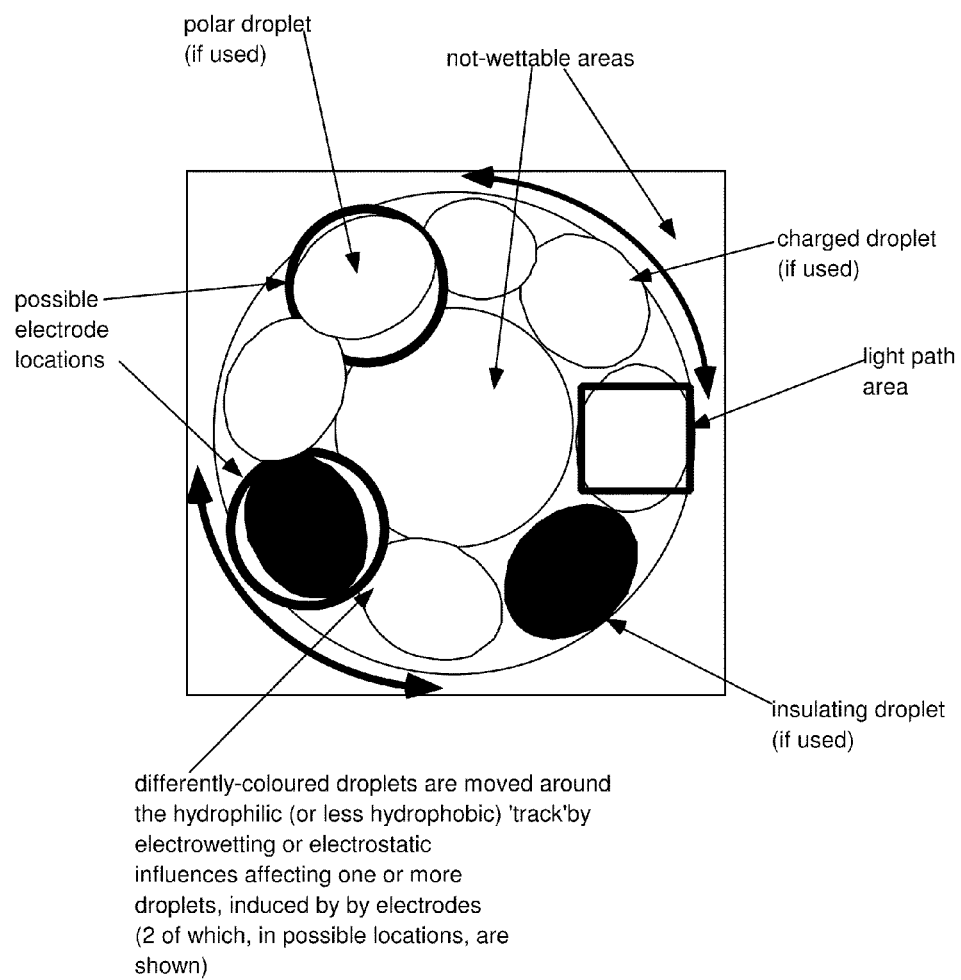
FIG. 8 is a top view of another preferred display system which utilizes droplets of different colours.

As shown in FIG. 8, another alternative layout has the advantage that there does not need to be a means by which the immiscible liquid droplets are attached to each other, or are joined to each other FIG. 8 shows a number of differently-coloured liquid droplets. In this particular example, only one of them is electrically-charged with a certain polarity.

The drawing also illustrates how other droplets could alternatively, or in addition, be composed of appropriate liquids as disclosed elsewhere in this document as alternative means of moving droplets. Clearly, the appropriate liquid and addressing methods appropriate to each of the different said droplet-moving methods would be supplied to make the selected system work.

Preferably, underneath the currently-shown location of each droplet is a separately-addressable electrode. By applying potential to each electrode in turn, the charged droplet can be pushed or manoeuvred around the ring—forcing the other droplets to move with it. Alternatively, as described elsewhere herein, one or more resistant electrodes could be located adjacent to one or more positions of the 'ring' shown, and appropriate potential delivered to the different address lines connected to said resistant electrode would cause affected droplet(s) to change their positions accordingly.

The above approach can be applied to the other methods by which coloured droplets are moved into a light path. The droplets, again, cannot escape their 'race track' due to the repelling properties of the wetting surface on each side of each droplet, towards the centre and towards the outside. Such properties can, conveniently, be deposited onto the surface upon which the droplets are located by printing or other suitable means. Alternatively, any other suitable means of delimiting the locations where the droplets can move to can be provided. Depending upon the material from which the droplets are made, they may be depositable by such techniques as ink jet printing.

A Similar Approach, Using Permanently-Coloured Polar Liquid Droplet Driven by Local (Insulated) Electrodes' Electrical Potential, Instead of One or More Permanently-Charged Droplet(s)

A very similar approach can be used where droplet(s) of polar liquid are attracted towards, or repelled from, locations on a hydrophobic polymer surface adjacent to one or more appropriate-charged electrodes, with a ground plane on the other side of the system, as explained herein.

Just as in the coloured droplet approach above, one or more droplets of polarised liquid may be used, where said droplet(s) is/are located in an electrically insulating liquid, and other differently-coloured droplets may be composed of any suitable liquid—for example, insulating liquids such as silicon, provided that each droplet will preferably remain (as above) immiscible with the others. As newly-hydrophilic sectors of the polymer along which the drops are located are 'created' by appropriate electrical potential delivered to proximate insulated electrodes (as explained herein), the polar liquid coloured droplet will move from sector to sector, and the droplet currently in the path of light will cause said light to become a similar colour to said droplet.

A Similar Approach Using Oil (or Other Suitable Insulator Liquid) Droplet(s) in a Suitable Electrolyte.

The same basic approach can be used where an oil droplet is the item induced to move by electrowetting means, as explained elsewhere in this document, and otherwise performing a similar role, together with other liquids of appropriate composition and of different colours, as described herein.

In all the above systems, lens arrangements can be made as explained elsewhere herein, and/or reflective surfaces can be provided or absent, according to the manner of illuminating the display means.

Optionally, with any of the above coloured droplet-moving systems, a liquid immiscible with the other droplets may be used to enclose the differently-coloured elements so that it is, for some exterior purposes at least, a single droplet.

Differently-Poled Permanently Electrically-Charged Coloured Droplets or Other Suitable Non-Liquid Items Using any suitable approaches described herein, droplets of liquid, or other solid charge-retaining solids, could be induced to take and/or retain a charge of opposite polarity at different points within their shape. By changing the polarity of proximate electrodes in the manner described above, such droplets or solid items could be caused to have different parts of their total area, bearing different colours, pass into and out of one or more light paths, thereby displaying different colours to the observer. Such approaches could include reflective surfaces for front-lit systems, or suitable lens arrangements for backlit systems.

Use of any of the Colour-Changing Systems Described Herein for the Purpose of Changing the Exterior Perceived Colour of any Suitable Items.

Although the colour-changing systems described herein have been dealt with in the context of colour display systems suitable for screens, etc., it should be pointed out that any of these inventions may also alternatively be used in a similar manner to change the exterior colour, or pattern of colours, on the exterior surface of any suitable items.

As an example, the colour, or pattern of colours, on the outer surface of a mobile phone could be changed dynamically by laying an appropriate one of the described systems along or close to its surface(s). The same approach could be used to change the colour(s) of innumerable other commonplace items.

Use of any of the Colour-Changing Systems Described Herein for the Purpose of Projecting the Light of Dynamically Changeable Colour(s)

In the same way as any of the colour-changing systems (or any combination thereof) described here are arranged, such systems may be used to project images or coloured light, or to change the colour of light where any suitable type of light source is employed, so that said light source would appear to the observer to be of different colour(s) when dynamic changes to the control of different optical elements within the design were made. This would include using any of said systems as a simple light filter means rather than for a display screen—e.g., for placing in front of any kind of light source—e.g., halogen, or LED, or neon, incandescent, ambient, etc. These systems could thus be employed for such purposes as the changing of the colours of lights in interior or exterior locations, or for theatre, building, swimming pool, etc. lighting. It should be noted that the light-changing systems described herein need not necessarily be employed in an array, but may instead be used as a single colour-changing cell arrangement.

The Use of an Additional Electrical Potential Between the Stylus (in Stylus-Employing Display Systems Described Herein) and One or More Conductive Elements Underneath (in Light-Reflective Systems) the Light Filters, and Insulated from the Counter-Electrodes Located Under the Polymer Layer.

Optionally, in the case of any of appropriate versions of the stylus-employing display systems described herein, an additional electrical potential may be applied between the stylus and one or more conductive elements acting as counter electrodes which are located on the opposite side of the screen system to that of the stylus—i.e., are located underneath the polymer or (where appropriate) other insulating layer For example, in the case of a light-reflective system, the objective would be to enhance the forces acting on droplets beneath or adjacent to the stylus by having an electrical 'loop' from the stylus to one or more conductive surfaces underneath the light filters—optionally, where said conductor(s) are separately addressable. Said conductive layers should preferably be separately addressable from, and insulated from, the counter electrodes designed to attract (or repel) droplets lying in contact with the polymer or insulating layer. This additional counter-electrode would preferably extend across the whole screen area, and would be electrically insulated from the droplets and any electrolyte used.

For a similar purpose, in appropriate stylus-employing screen display systems described herein, an electrical charge may be delivered into the electrolyte so as to enhance the stylus's ability to move droplets, or for other purposes such as affecting the shape of droplets. Such a charge may be electrically connected to the electrolyte, or may alternatively be an electrical potential delivered to one or more conductive elements immediately proximate to the electrolyte (e.g., adjacent to, or beneath, the top transparent screen's surface) but electrically insulated from it.

Dynamic Control of Droplet Shape to Change its Optical Performance

The shape of a liquid droplet can be electronically induced to change its shape, so that instead of re-positioning itself to cause light to be selectively directed onto different adjacent colours, and thereby to be displayed to an observer of the display system (as is described as achieved by various alternative or complementary means described herein), in the approach introduced here, the droplet is instead induced to change its shape, and thereby to defract (or reflect) light onto differently-coloured visual indicia or filters proximate to it, according to the electrical potential delivered to one or more electrodes located at appropriate positions proximate to said droplet.

FIGS. 9 (a)-(c) show rather crudely how this may be achieved. Because this effect may be achieved in a number of different ways, the electrical addressing means, and other elements of the system are not shown, as each alternative arrangement appropriate to achieving the effects described below are described herein.

Figure 9A:
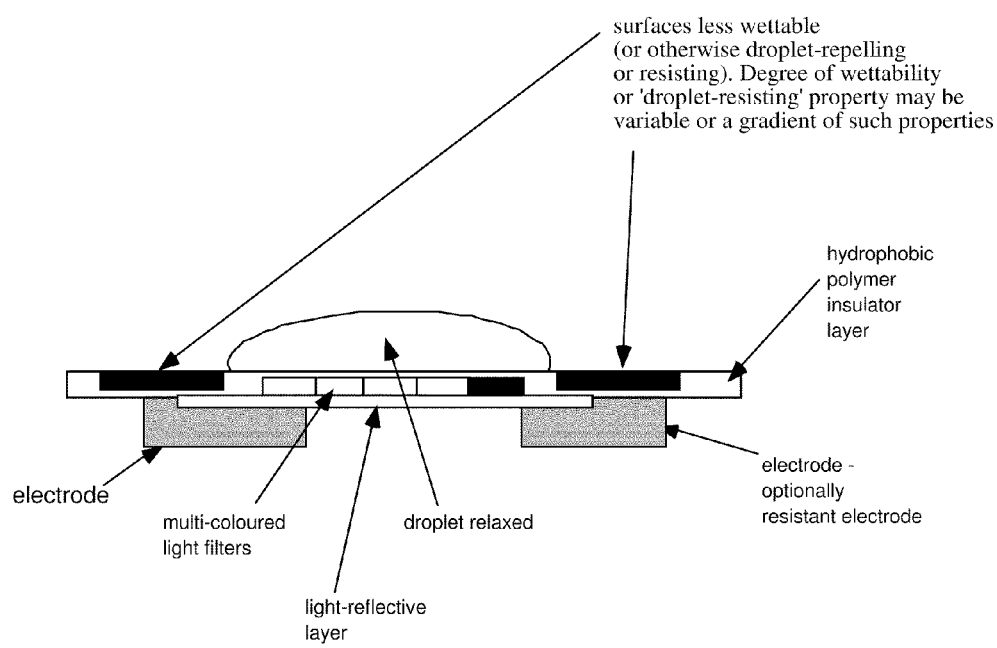
FIGS. 9(*a*)-(*c*) are cross-sectional views of a preferred display system in which the shape of the droplet shown, which is located on a hydrophobic polymer surface incorporating different wettability levels, is modified (and thus its optical properties are changed) by the application of electrical potential to one or more adjacent electrodes electrically insulated from the droplet.
Figure 9B:
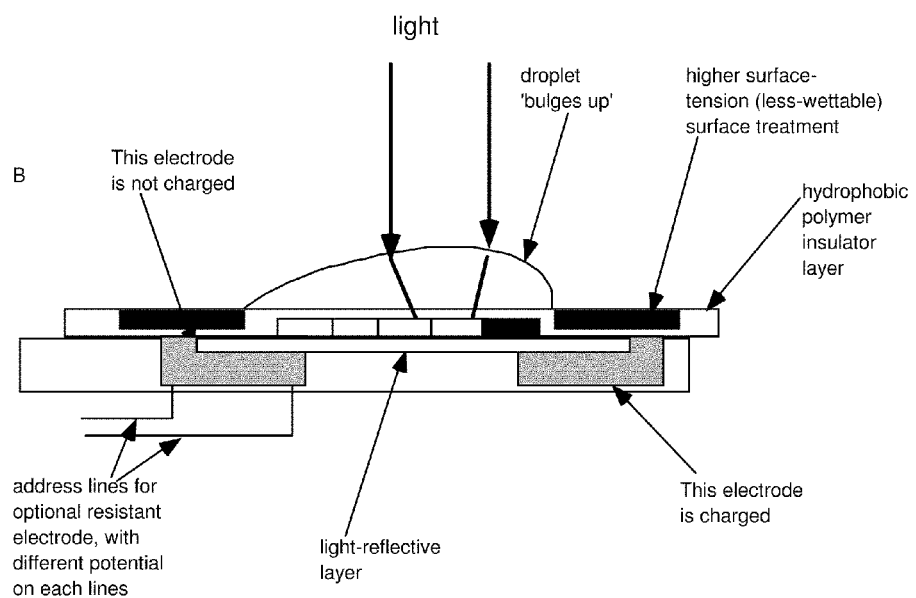
Figure 9C:
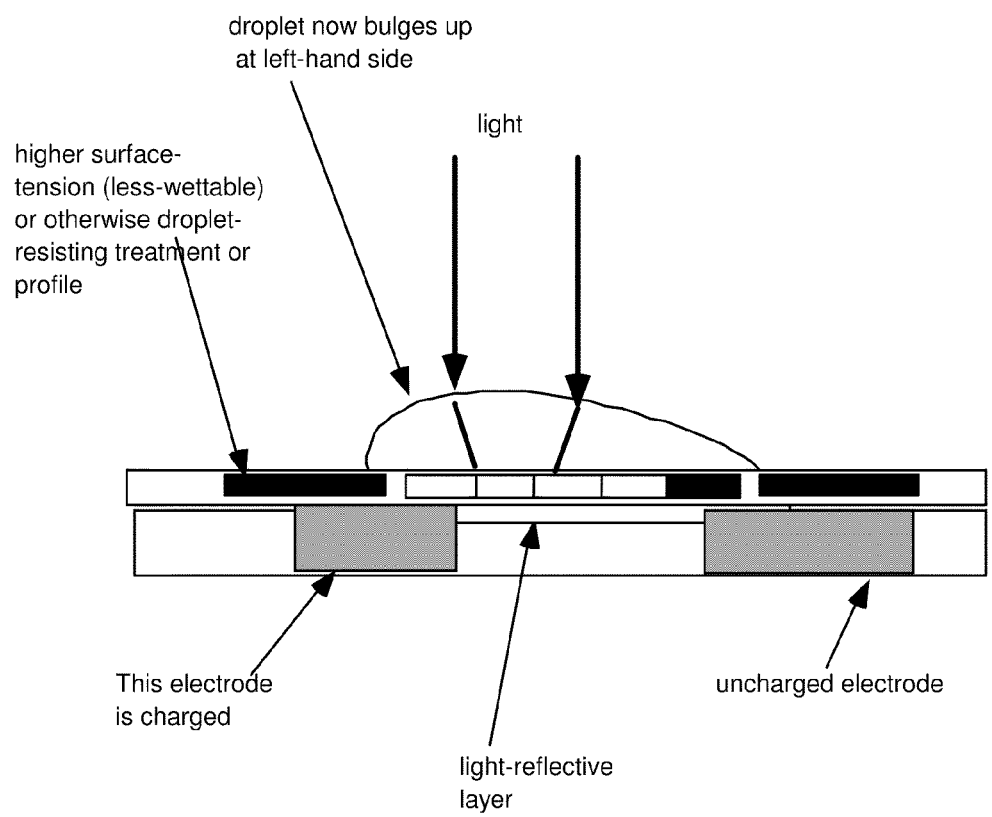

In FIGS. 9(a)-(c) a droplet of a suitable liquid (as described herein) is positioned on an electrical insulator, which will in most design approaches be a hydrophobic polymer. Surrounding the droplet are surfaces which are less wettable than the areas surrounding them when the adjacent electrode is charged, or are, due to any other suitable design feature relatively repellent to droplets moving onto them than are the other adjacent surface areas These surfaces may for example, be permanently treated so as to be of sufficiently high surface tension to repel or prevent the droplet from moving above them, even when electrical potential is applied to local electrodes, thereby inducing said droplet to be attracted to move to positions above or immediately adjacent to said charged electrode(s).

These areas may alternatively function so as to be, or to become, less hydrophilic—when adjacent electrodes are suitably charged with an electrical potential so as to change the hydrophobic/hydrophilic properties existing at polymer surfaces proximate to said electrode(s)—than other surfaces adjacent to the droplet, thereby causing the droplet to be more attracted to the more hydrophilic areas.

Two separately-addressable electrodes, located underneath the insulating layer, are also shown. A multi-coloured filter array is shown located beneath the droplet.

In FIG. 9(a) no electrical potential is applied to either locally-positioned electrodes.

In FIG. 9(b) a potential has been applied to the right-hand electrode, so as to induce the droplet to move towards that charged electrode. The droplet, for example, may be positively charged, and the electrode in question may be receiving a negative charge of suitable potential so as to attract the droplet. In this case, there are conflicting forces acting on the droplet: the differently-poled influence as against the droplet-repelling forces induced by less wettable surfaces existing at the red-marked zone partly above the currently-charged droplet. Alternatively, the droplet may be a polar liquid located in an insulating liquid (surrounding liquids, and other elements of the system, are not shown here): the 'less wettable' areas of the polymer layer (shown) are sufficiently repellent to the droplet that its surface angle to the polymer plane becomes steep, and the droplet presents an optical profile which is higher on that side than on the other.

With appropriate electrical potential delivered to the currently-charged electrode, and with suitably less wettable or unwettable surfaces at the indicated surfaces, it will be appreciated that the droplet may be caused to become more or less bulbous at its right-hand side in comparison with its left-hand side. As a consequence of this, it will defract light passing onto or through it in different ways according to its shape. In FIGS. 9(a)-(c), where coloured filters are located below the droplet, different colours may thereby be reflected (in the case of a reflective display) or transmitted in an (e.g.) backlit display to be accordingly displayed to the observer of such a system as a colour change at this point.

It will be further appreciated that while FIGS. 9(a)-(c) are of a certain configuration to allow light to pass onto or through certain differently-coloured filters, the same basic approach may be used for many other applications where the droplet may reflect light onto different colours due to its changing shape, or where the droplet may as a result of its changing shape modulate light passing through, or reflecting off it, so as to function as a switch means enabling different amounts of light, or different frequencies of light, to pass through or reflect off it.

In respect of colour-changing systems for display purposes, any suitable means associated with droplet-moving systems described herein may be applied to distort droplet shape. The droplet, therefore, may be a polar liquid located within an insulating liquid, for example, or it may be an insulator located in an electrolyte liquid, and so on. If electrowetting forces are causing the droplet to be induced to move in the above example to the right, then clearly the arrangement would include means to cause the surface shown as red rectangles to be less hydrophilic, or indeed to be hydrophobic, when the charge is applied to the electrode adjacent to said indicated rectangles in the drawing at the polymer surface.

In FIG. 9(c) the left-hand electrode has been charged with a suitable electrical potential, and the right-hand electrode is no longer charged. We see that now some light reaching the droplet is focussed onto a different area of the coloured light filter array.

For other desired optical or other effects, multiple electrodes affecting the forces acting on a droplet, such as those shown above, for example, may be simultaneously be charged with suitable electrical potentials.

It should be noted that the methods described for delimiting, or restraining or modifying, the movement of droplets to various different locations may also be used in any other appropriate optical system, including those described elsewhere in this document.

Optionally, a high surface-tension means of preventing the droplet from moving above designated locations beyond its surface perimeter area may be replaced with any other alternative means which prevent or lessen the forces inclining the droplet to move to locate itself above, or to a particular location in respect of, charged electrodes. Thus, as an example, the surface upon which the droplet is moving may be raised up or lowered down to increase or reduce the effect of the charged electrode on the droplet.

It should be noted that the above diagram and explanation is given on the basis that the droplet is attracted to move to place itself closer to an electrode (or closer to a polymer area whose surface has become hydrophilic). The same basic approach may alternatively be used where the forces acting on the droplet cause it to be repelled from a certain position, but where delimiting elements in the design prevent it from fully moving to certain locations, so that the droplet shape distorts into one where the angle of the droplet in respect of the surface upon which it is located is different at different points around the perimeter of the droplet.

The Application of Heat to the Interface Area Between Droplets and the Area of Polymer Surface in Contact with them, so to Reduce the Surface Tension of the Effected Droplet(s)—and Thereby to Affect its/their Susceptibility to Locally-Induced Forces (e.g., Electrowetting Influences) Affecting them which, in the Absence of Said Locally-Applied Heat would be Insufficient to Cause Said Droplet(s) to Change its/their Current Position, but in the Presence of Sufficiently-Increased Heat-Inducing Means at the Droplet-Polymer Surface Interface, Will Cause Said Droplet(s) to Change their Position Along the Polymer Surface in Respect of Differently-Coloured Light Filters or Light Reflectors.

The surface tension of droplets can be affected by temperature changes induced in the interface between the droplet and the hydrophobic polymer surface with which they are in contact. This provides a potentially useful means of causing one or more 'targeted' droplets in a visual display system, which are proximate to a suitably-equipped stylus, to be more, or less, affected by any local electrowetting influences induced by adjacent insulated electrodes. Thus, as an example, if—as is described elsewhere in this document—a droplet of polar liquid in an insulating liquid is attracted to move towards a suitably charged electrode adjacent to it but insulated from it, where for example a ground plane is located above, but insulated from, said droplet, the application of a temperature increases to said droplet-polymer surface interface could be used to enhance said droplet's tendency to move along the polymer surface adjacent to it towards the currently-charged electrode, caused by said surface becoming hydrophilic.

As just one example of how an induced temperature change in said droplet to affect its surface tension could be useful in the above example, consider the case where complex addressing systems would otherwise be necessary in the display system—that might, for example, require more addressing lines than desired, or might require the use of such components as diodes or transistors at each 'cell' to allow appropriate potentials to be delivered to the 'target' cell as well as to other cells in a display system so as to cause a change of location in only the targeted droplet: in such a case, if the local presence of the stylus changes, via the employment of a suitable electrically-powered arrangement, the temperature of said droplet so as to cause it to be the only droplet in the display system where the balance of forces inducing it to change position are greater than those inducing it to retain its position, then clearly the employment of such an approach could facilitate the use of a much more simple address system.

As a more specific example, consider the situation where the electrode that is currently charged to induce the droplet to move along the polymer layer towards it due to hydrophilic properties being induced along the polymer layer local to said electrode—that said electrode is connected to a row-and-column address system arranged so that droplets along the same row and column as the targeted droplet will be also be subjected to forces tending to move all or some of them from their current position.

In such a case, if the heating of the targeted droplet(s), achieved by any suitable means which is induced only on one or more (as desired) droplets immediately proximate to the stylus tip, then the change in surface tension induced by temperature change of said droplet(s) will be sufficient to change their resistance to changing their position—or expressed differently, will serve to increase the balance of forces acting on them change their position—and as a result, said targeted droplet(s) will move towards the adjacent area of greater hydrophilic properties, whereas other droplets in the display (in this example, other droplets along the charged row and column) will not move, because their surface tension properties at that time are such that said balance of forces acting on them is insufficient to cause them to change position.

Any suitable means can be employed to cause droplets adjacent or proximate to the stylus tip to become hotter when switch means associated with the stylus is set to cause such an effect. The stylus, for example, might in its tip incorporate heating means; or it might incorporate any suitable other energy-generating means—e.g., a laser or ultrasonic emissions—which directed towards and focussed on the surface underneath droplets adjacent to the stylus within the screen system, thereby cause them to heat up. The system might incorporate means by which the current position of the stylus can be ascertained, and in addition incorporate a suitable addressing means to direct electrical potential to conductive elements proximate to the droplets adjacent to the stylus tip to be energised and thereby rise in temperature; any other Ohmic heating technique might be used—and so on. There are almost innumerable means of causing the droplet-surface interface(s) proximate to the stylus tip to be heated up: the important point here is that any suitable means of doing so may be employed.

Employment of Variable Surface Tension, or Wettability, Properties on an Insulating Surface to Modify the Behaviour of Droplets It will be appreciated from the above description that permanent treatment can be made to insulating surfaces so that droplets in a suitably-configured droplet-moving display system can be inhibited, or induced, to move to locations of different wettability in the presence of one or more appropriately-charged electrodes proximate to, but insulated from, said droplets.

Such variable wetting surfaces along an insulating surface can be used for a number of purposes other than those described elsewhere in this document.

One application is to introduce variable wetting along a surface that a droplet may move as a result of different potentials being applied to one or more electrodes insulated from, but proximate to, said surface. For example, if a droplet is free to move along, e.g., an insulating hydrophobic polymer surface underneath which there are three different electrodes with associated and respective different-coloured light filters, it may be useful to locate areas of less wettability (even when electrodes are charged) between the areas of the polymer surface immediately adjacent to the electrodes, so that, for example, the droplet will, if sufficient forces are acting upon it, overcome one such 'less wettable area' in order to move to the next—and may thereby cause a different colour to be displayed. The forces acting on it at this new location, however, may be insufficient to enable it to either overcome the less wettable 'barrier' it has just crossed, or to overcome a less wettable area separating its current position from, for example, the polymer area further on, which is associated with a differently-coloured filter.

Many other uses of such variable wettability patterns can be conceived: it may, for example, be desirable for a droplet to take a particular route towards an area of higher attraction that than that where it currently resides: if the route is demarked with lower surface tension as the 'road', and higher surface tension as the road's perimeter, then clearly this provides a means of guiding droplets to take particular routes to different locations along an insulating surface.

Variable Potential Across a Resistant Electrode or Conductive Surface being Used to Selectively Induce One or More Droplets to Locate Themselves at Different Locations on an Adjacent Insulator Surface in Respect of Zones of Different Values of Electrical Potential Zones on Said Conductive Surface.

An extension of the above idea is a resistance electrode which has two or more different electrical potentials delivered to it at different points over its area—say, at different ends or sides of its shape—causing different electrical potentials to be present at different points over its area. Optionally, said electrode may incorporate areas of different electrical conductivity over its area.

Using this approach, a droplet adjacent to, but insulated from, said resistance electrode would—in the absence of other factors and in the context of an appropriately-configured arrangement such as those described in this document—be induced to move to that area of the (e.g.) polymer upon which it may lie which is closest to the highest-potential area of said electrode.

It will be appreciated that using this approach, one or more droplets may be 'steered' from position to position on the insulator separating, but adjacent to, said variable-potential resistant conductor.

Optionally, another element can be added to the above approach: areas of the insulator—e.g., a hydrophobic polymer surface—may be permanently-treated or prepared so as to have—when adjacent conductive areas are charged (or, in optional versions, not charged) with a potential, as appropriate and desired—a higher or lower wettability, or surface tension, than other areas.

Using this approach, for example, a droplet may be induced by potential at a conductive area adjacent to it through the insulator, to move to a certain location, but may be contrarily impeded from doing so by a higher surface tension, or less wettable area of the (e.g.) polymer surface which prevents it from moving to where it would otherwise go. If increased electrical potential (or potential difference with, for example, a ground plane in some systems) is delivered to proximate said conductive area, however, the forces inducing the droplet to move closer to said conductor would eventually be greater than those repelling forces caused by the aforesaid permanent surface treatment—and the droplet would progressively move closer to the higher-potential zone(s) of the (preferably) resistant electrode in question.

This method can be used in many ways: as just one example, if differently-coloured filters are located adjacent to said insulator surface (such as is shown in many of the droplet-moving designs shown herein), the droplet could be induced to progressively move over different coloured filters as the potential applied to the electrode—or area of a resistant electrode—is increased.

Figure 10:
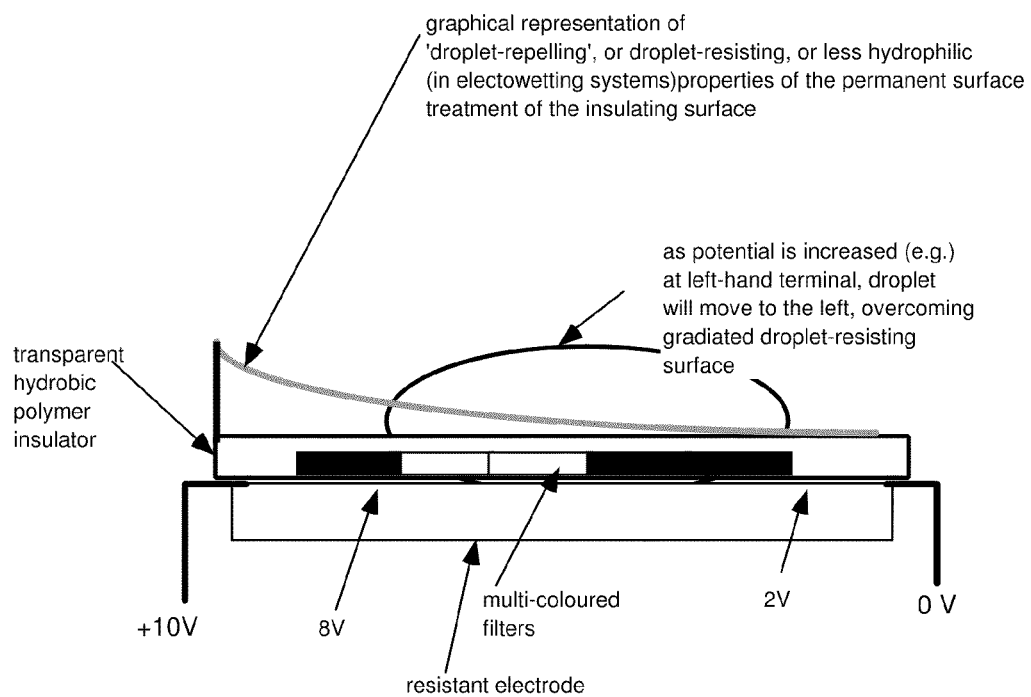
FIG. 10 is a cross-sectional view of a preferred display in which the a hydrophobic polymer layer incorporates areas of variable droplet-repelling capabilities; and the droplets are caused to be controllably moved in respect of different adjacent colour filters by changes in the electrical potential present at different points on a resistant electrode adjacent to, but insulated from, said electrode, by inducing changes in wettability of said polymer surfaces adjacent to said different locations across said electrode, and thereby inducing the droplet to move.

FIG. 10 illustrates this approach, which can be used in many different ways to direct a droplet to different locations by controllably varying the electrical potential across, for example, the same resistant electrode, and thereby creating different levels of forces at different points over an adjacent insulating surface upon which the droplet lies.

FIG. 10 shows how any suitable means, including variable levels of wettability or variable surface tension (or other droplet-repelling means), over the insulating surface permits the controlled movement of the droplet to different locations in respect of said resistant electrode, by modulating the electrical potential applied to said conductor at different points and/or, optionally, other conductors within the system.

Thus, in the drawing below, the potential is greatest at the left-hand end of the resistant electrode, but so are the 'droplet repelling' properties at the surface of the illustrated transparent insulator, such as hydrophobic polymer: thus, increasing the electrical potential applied to the left-hand wire leading to the resistant electrode, for example, could be expected to eventually induce the droplet to move fully to the left-hand end of the insulating layer.

Note that the use of the term "optionally, other conductors" is designed to include within this approach systems where a droplet may be electrically charged with a certain potential—and therefore other electrodes are not necessarily required to induce the droplet to move towards an oppositely-poled electrode.

This approach may be used in combination with any suitable different droplet-moving system in this document, or with other systems where, for example, it is useful to be able to selectively move a droplet (or other suitable item) to different locations by, preferably, only changing the electrical potential applying to one resistant electrode.

Mutual Combination of Inventive Design Elements Described Herein.

Any of the embodiments, or elements within said embodiments, described herein may be combined with any other embodiments, or elements of such, described herein, in any appropriate manner whatsoever.

The invention has numerous applications in a multitude of applications. While the invention has been described with reference to preferred embodiments, it will be understood by those skilled in the art that various changes may be made and equivalents may be substituted for elements thereof without departing from the scope of the invention.

In addition, many modifications may be made to adapt a particular situation to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A light-modulating display apparatus, comprising:
an insulative layer;
a light path extending through or onto the insulative layer;
a measure of liquid disposed on a surface of the insulative layer;
a spatial distribution of differently-colored light filters disposed in the insulative layer and configured to modulate at least one of the color and the intensity of the light; and
a pair of electrodes disposed adjacent to the sides of the measure of liquid and below the insulative layer,
wherein the apparatus is configured to apply an electrical potential to one of the electrodes while, at the same time, not applying an electrical potential to the other one of the electrodes, thereby employing an electrowetting effect to produce a lateral bulge in the measure of liquid in the direction of the charged electrode such that the measure of liquid is asymmetrical with respect to a central axis of the measure of liquid extending perpendicular to the surface of the substrate, and such that the measure of liquid selectively obstructs the passage of light through the light path, thereby modulating the amplitude or intensity of the light
wherein the measure of liquid comprises a nonpolar liquid, the measure of non-polar liquid being immiscible in and in contact with a measure of polar liquid which, due to the electrowetting effect, is caused to change its location or shape, thereby causing the measure of non-polar liquid to change its location or shape.

2. The apparatus of claim 1, further comprising a light source to provide the light.

* * * * *